United States Patent [19]

Bank et al.

[11] Patent Number: 5,547,230
[45] Date of Patent: Aug. 20, 1996

[54] JOINT FOR VARIABLE WALL THICKNESS CONDUIT

[75] Inventors: Michael D. Bank, South Euclid; Thomas W. Hawkins, Aurora, both of Ohio

[73] Assignee: The Lamson & Sessions Co., Cleveland, Ohio

[21] Appl. No.: 430,434

[22] Filed: Apr. 28, 1995

[51] Int. Cl.$^6$ .................................................. F16L 17/035
[52] U.S. Cl. .......................... 285/110; 285/345; 285/423
[58] Field of Search .................................... 285/330, 351, 285/423, 345, 110

[56] References Cited

U.S. PATENT DOCUMENTS

| | | |
|---|---|---|
| 2,032,492 | 3/1936 | Nathan . |
| 2,615,740 | 10/1952 | Nathan . |
| 2,809,853 | 10/1957 | Nathan . |
| 3,998,478 | 12/1976 | Zopfi . |
| 4,099,745 | 7/1978 | Cobbs ................................. 285/330 X |
| 4,279,425 | 7/1981 | Beacom ............................. 285/110 X |
| 4,552,485 | 11/1985 | Hammer . |
| 4,565,381 | 1/1986 | Joelson . |
| 4,641,858 | 2/1987 | Roux . |
| 4,662,655 | 5/1987 | Fliervoet et al. .................... 285/423 X |
| 4,664,421 | 5/1987 | Jones . |
| 4,779,902 | 10/1988 | Lee ...................................... 285/423 X |
| 4,796,669 | 1/1989 | St. Onge . |
| 4,801,222 | 1/1989 | Fröhlich . |
| 4,898,498 | 2/1990 | Akesaka . |
| 4,958,959 | 9/1990 | St. Onge . |
| 5,083,820 | 1/1992 | Hopperdietzel ..................... 285/351 X |
| 5,104,263 | 4/1992 | Shibahara et al. . |

FOREIGN PATENT DOCUMENTS

| | | |
|---|---|---|
| 634612 | 1/1962 | Canada . |
| 880677 | 5/1953 | Germany . |
| 3826622 | 2/1990 | Germany . |
| 379853 | 9/1964 | Switzerland . |
| 1216325 | 12/1970 | United Kingdom . |

*Primary Examiner*—Dave W. Arola
*Attorney, Agent, or Firm*—Jones, Day, Reavis & Pogue

[57] ABSTRACT

A force-transmitting joint formed between two pipe sections is provided that is particularly suited for an extruded, plastic pipe having a variable wall thickness. The joint has a smooth outer surface and a constant gap in which a sealing member is retained. The pipe section has an outer wall including an outer surface and an inner surface with a variable wall thickness defined therebetween. A first end of the pipe section includes a first joint member comprising a first support surface having a constant width. The first joint member further comprises an outwardly extending sealing leg having a variable width. A second end of the pipe includes a second joint member comprising a second support surface having a constant width which is less than the width of the first support surface. The second joint member further comprises a recess having a variable thickness. An annular sealing member is assembled onto the sealing leg. When the first joint member of one pipe section is joined to the second joint member of another pipe section, the first support wall and second support wall align in a force-transmitting relationship, the sealing leg is at least partially received in the recess and a constant-width gap is formed between a wall of the recess and the sealing leg. The sealing member is retained in the constant-width gap.

9 Claims, 4 Drawing Sheets

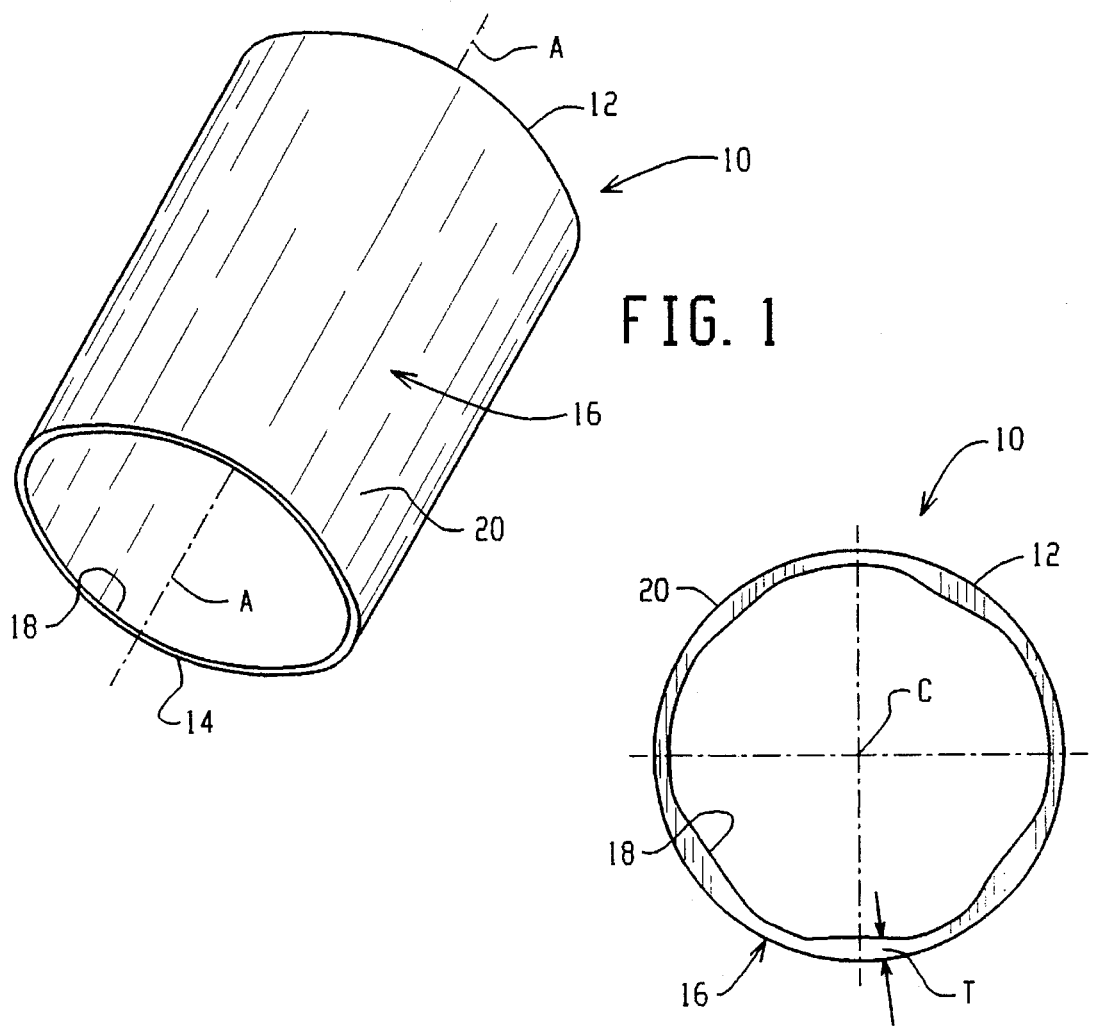
FIG. 1
FIG. 2
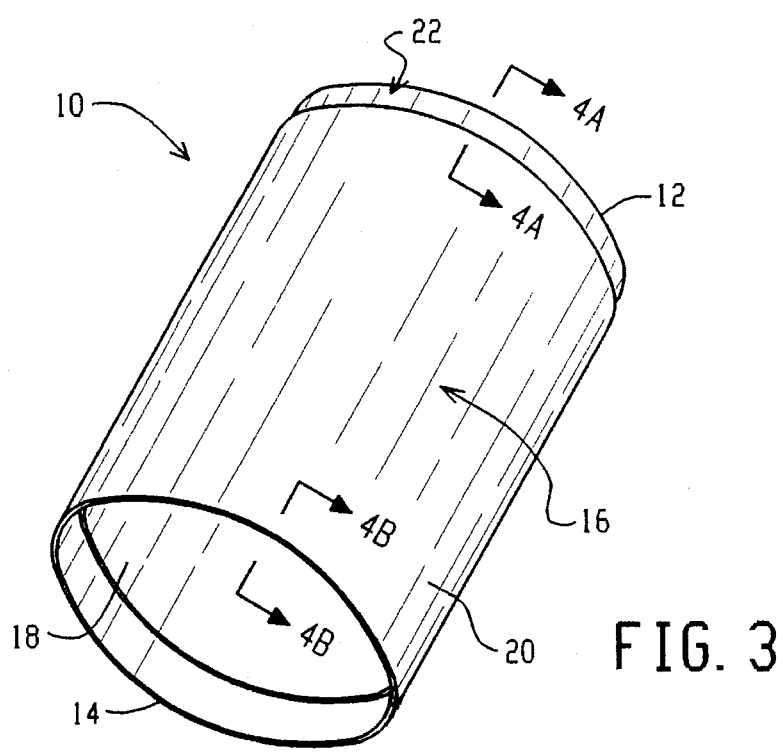
FIG. 3

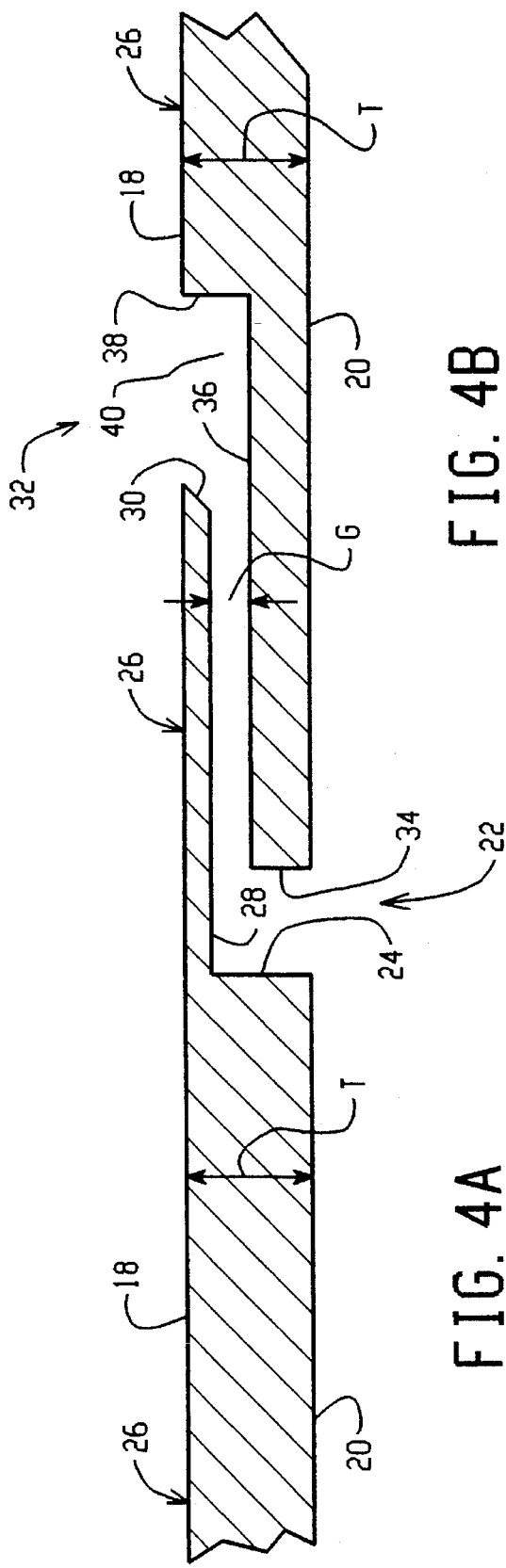
FIG. 4A
FIG. 4B
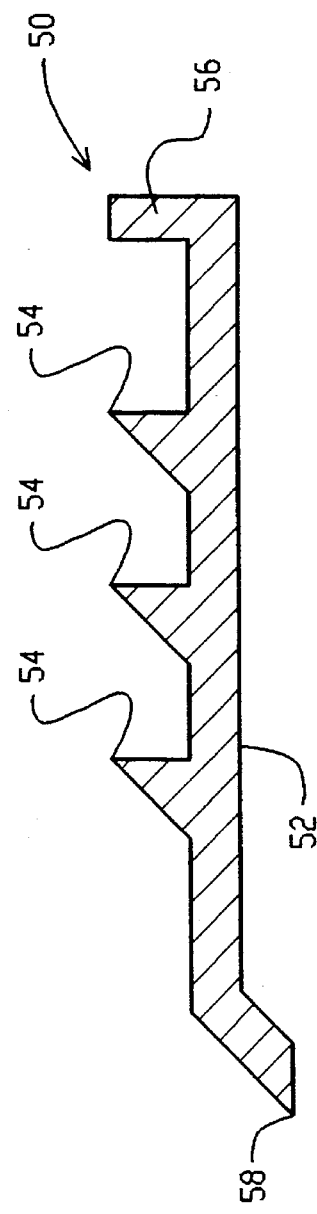
FIG. 5

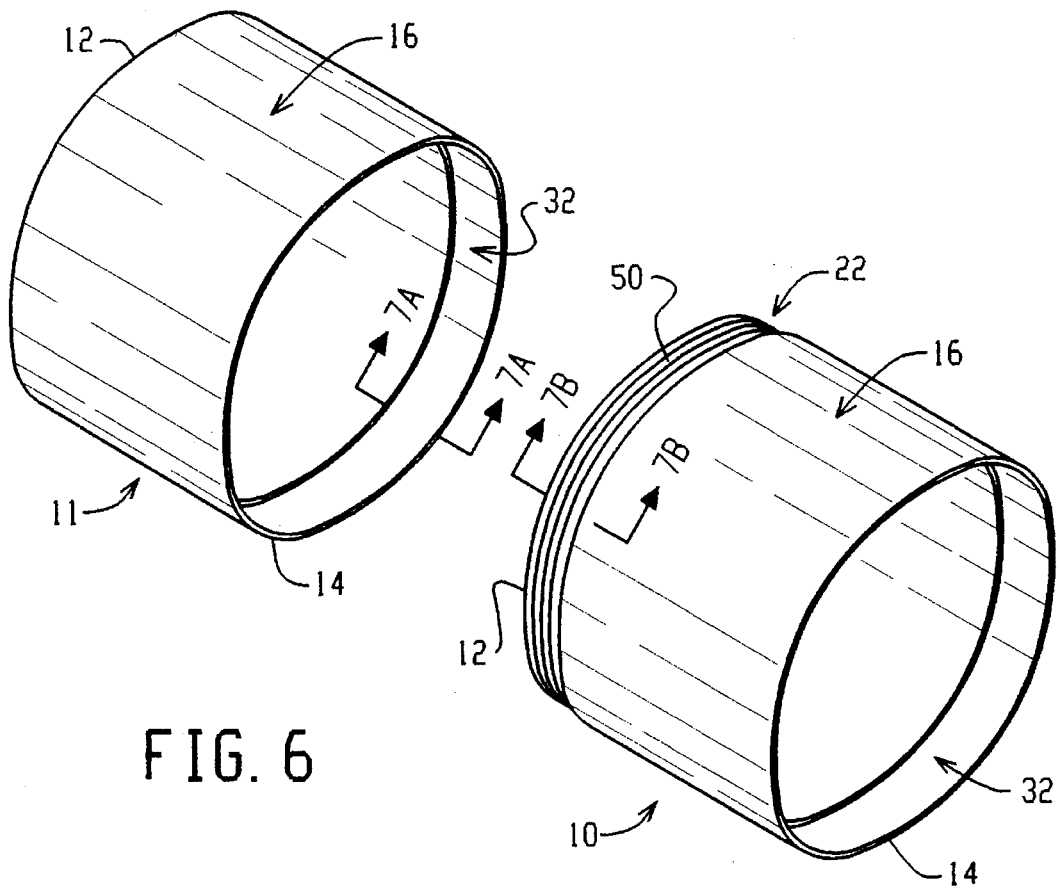
FIG. 6
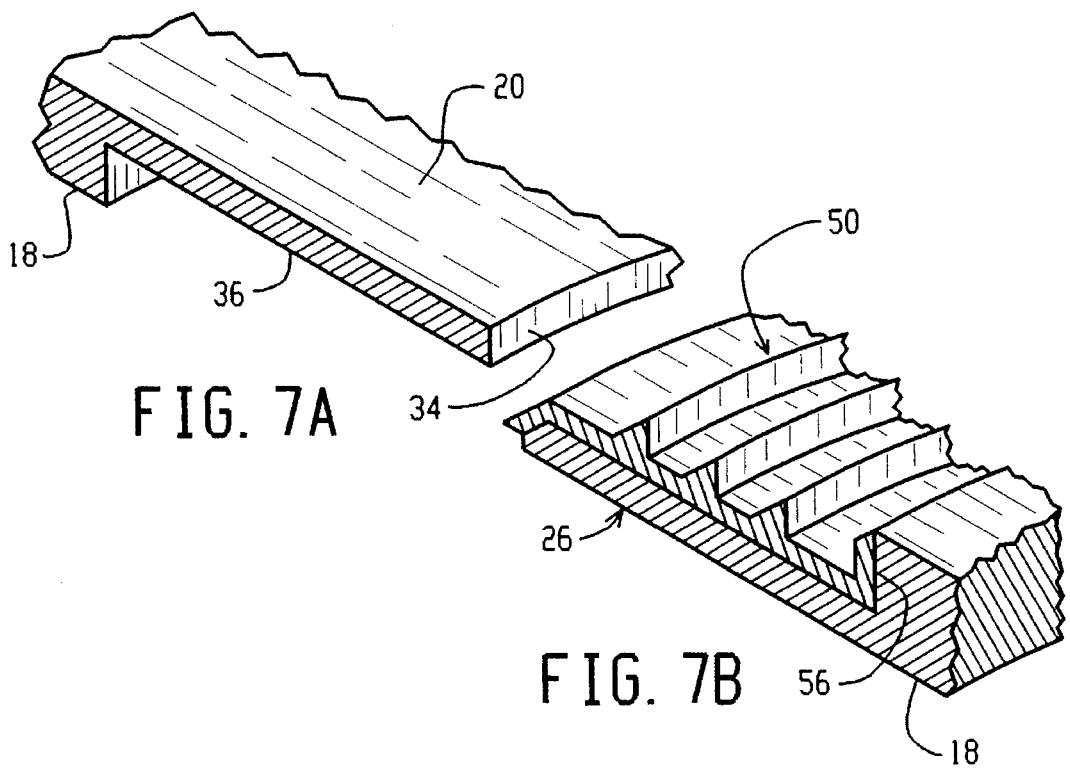
FIG. 7A
FIG. 7B

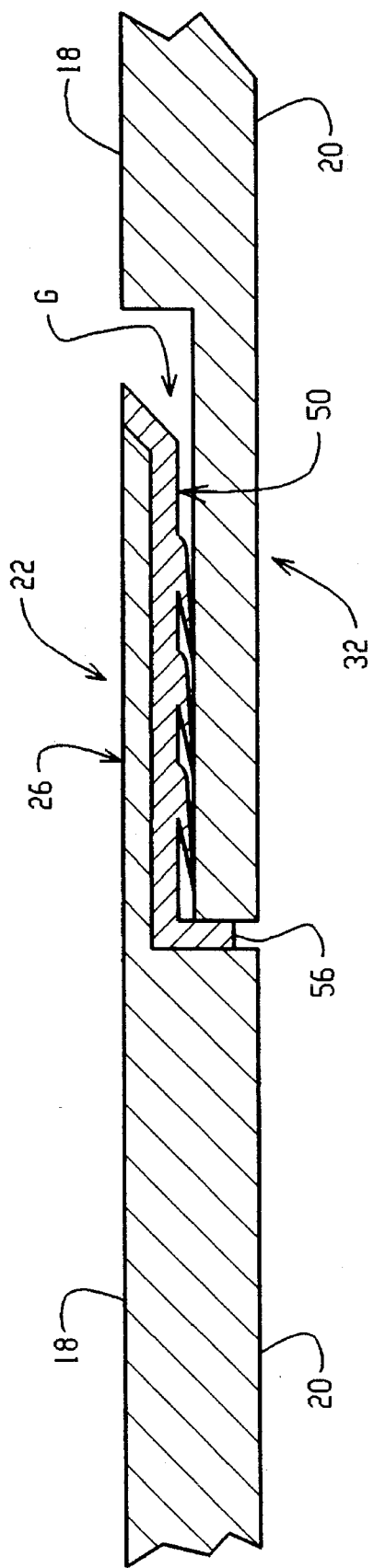

JOINT FOR VARIABLE WALL THICKNESS CONDUIT

FIELD OF THE INVENTION

The present invention relates to joints formed between pipe sections. More particularly, the present invention relates to joints formed between plastic pipe sections particularly useful in microtunneling, sliplining or pipe bursting applications, wherein the pipe sections have a variable wall thickness.

BACKGROUND OF THE INVENTION

Pipes that contain and transport water are used in numerous applications, which are generally divided into the broad categories of non-pressure and pressure applications. The present invention is useful on pipes suitable for both non-pressure and pressure applications and is particularly useful in sewage and drain pipes. Other applications for the present invention are also contemplated, such as conduit sections used for housing telecommunications cable, fiber optics cable and electrical wire or cable.

Pipe can be installed in a number of ways, one of which is the traditional pipe laying technique of simply digging a trench and then placing the pipe sections in the trench, assembling the sections into a pipeline and then covering the pipeline. There are also trenchless pipe installation methods known as microtunneling, sliplining and pipe bursting, which are described below. The present invention can be used in traditional applications and is particularly useful in trenchless applications.

Microtunneling describes a process in which a vertical access shaft is excavated to the pipe's starting grade. The term starting grade means the level, or depth, at which the pipe will be installed. A second vertical access shaft is constructed at the ending location for the pipeline, the pipeline therefore being erected between the two vertical shafts. A microtunneling machine, which is usually a remotely controlled, steerable, boring machine having a cutter head at one end, is lowered into the first access shaft. The microtunneling machine bores or cuts through the wall of the shaft and the cutter head drills a tunnel through the soil towards the second access shaft. The soil that is displaced by the cutter head is removed by either an auger system, by which the soil is mechanically moved from the hole, or a slurry system, which uses water to flush the loose soil from the hole.

Before the entire microtunneling machine exits the access shaft and enters the tunnel, a pipe section is attached to the rear of the machine. Axial compressive force, or pressure, directed along the longitudinal axis of the pipe section, is applied to the end of the pipe section opposite the machine. This force pushes the machine forward, with the pipe section attached, into the tunnel towards the second shaft. A second pipe section is then attached to the first, then a third is attached to the second and so on. This process of adding additional pipe and pushing the machine forward continues until the machine enters the second access shaft. At that point, an entire length of pipe, consisting of a plurality of pipe sections, is formed between the access shaft and the second shaft. The machine is then disconnected from the pipe and the pipeline is complete.

During the tunneling process, the machine is advanced forward by pushing against the end of the last pipe section attached and transmitting axial compressive force through the connected pipe sections. Therefore, the pipe sections must be joined in a manner so that a significant amount of axial compressive force can be transmitted through the joints without buckling, or otherwise damaging the joints or the pipe sections. Furthermore, the tunnel formed by the microtunneling machine is preferably just slightly larger than the diameter of the pipe because the larger the diameter of the tunnel, the greater the chance that the tunnel will collapse. If the pipe joints include sections that project outward from the diameter of the pipe wall, a larger tunnel must be bored to accommodate the pipe joints and there is a greater chance that the tunnel will collapse. Therefore, it is important that the pipeline have a smooth outer surface.

Sliplining is a method of rehabilitating deteriorated pipelines by inserting a new, small diameter pipe, called a slipliner pipe, inside of an existing large-diameter pipe. When sliplining, an access pit is dug to an existing pipeline; the access pit being slightly longer than the length of one section of the slipliner pipe. The top half of the section of existing pipe exposed at the bottom of the access pit is removed leaving the bottom half which is known as a pipe cradle. A slipliner pipe section is then placed inside the pipe cradle and is pushed into the existing pipe, parallel to the longitudinal axis of the existing pipe. A second slipliner pipe section is then lowered into the pipe cradle and joined to the first section. The second pipe section is then pushed into the existing pipe causing the first pipe section to advance further into the existing pipeline. Additional pieces of pipe are joined and the assembled pipe is advanced until the existing pipeline is completely sliplined or until the next access pit is reached. When the sliplining is completed, grout or other sealing material is pumped into the gap between the existing pipe and the new pipe along the entire length of existing pipe that was sliplined.

Often, the existing pipe to be sliplined is broken and dilapidated. The existing pipe's joints are sometimes separated and pieces of debris or sections of the existing pipe extend into the pipe cavity creating obstructions. Furthermore, if slipliner pipeline has flared, or wide, joints, the pipeline inserted into the existing pipe will have a relatively small diameter as compared to the existing pipe and therefore may not be capable of transporting a large enough volume of liquid. Therefore, it is important that a slipliner pipe have a smooth outer surface. Additionally, slipliner pipe sections also must be capable of efficiently transferring an axial compressive force from one pipe section to another.

Pipe bursting is another method of pipeline rehabilitation in which the existing pipe is replaced by a pipe having a diameter equal to or larger than the existing pipe. In this method, access is first gained to an existing pipe through a manhole or access pit. A small diameter steel pipe is inserted through the existing pipeline to a second access location. A pipe bursting head, which is generally a solid metal cone, is then attached to the steel pipe at the second access pit. The steel pipe with the pipe bursting head attached is then retracted towards the first access location by pulling the pipe. As the bursting head is pulled through the existing pipe, the existing pipe bursts into pieces that are displaced into the soil. A new pipe is pulled behind the pipe bursting head and creates a new pipeline. Pipe bursting creates numerous snags or obstructions, which are usually pieces of broken existing pipe. Therefore, it is important that the outer surface of the new pipe be smooth and have no projections.

When forming a length of pipe to be used in the above-described applications, several pipe sections are generally mated, or joined, in an end-to-end relationship and the connection between the mated, or joined, pipe sections is referred to as a joint. Many types of pipe joints are disclosed in the prior art.

U.S. Pat. No. 2,032,492 to Nathan discloses a pipe joint assembly particularly useful for terracota and ceramic pipes, wherein the pipe is molded and includes a first end having a larger diameter than the second end. When two pipes are joined, an annular flexible gasket is placed on the smaller diameter end of the first pipe and this end, including the gasket, is inserted into the large diameter end of the second pipe thereby forming a waterproof joint.

U.S. Pat. No. 4,565,381 to Joelson discloses a concrete pipe wherein one end of the concrete pipe has a tongue element extending about the annular periphery thereof and a flexible, stepped sealing element is attached to the tongue. The second end of the pipe has a groove element having a stepped sealing surface. The stepped sealing surface of a first pipe section is joined with the tongue on a second pipe section, whereby it seals against the stepped flexible seal.

U.S. Pat. No. 3,998,478 to Zopfi discloses a sealing joint construction, including a gasket, specifically for use with plastic pipes. The joint is formed by inserting a spigot (i.e., a narrow) end of a first pipe section into a bell (i.e., a flared) end of a second pipe section. Preferably, the bell end is "double belled" meaning that it has a narrow diameter bell section and a wider diameter bell section. The spigot end of one pipe section is received in the narrower bell portion of a second pipe section and part of the barrel, i.e., the main body of the pipe, of the first pipe section adjacent the spigot end is received in the wider bell portion of the second pipe section. The outer end of the second pipe section, which is formed adjacent the wider bell portion, is wider than the barrel of the first pipe. Hence, an annular groove is defined between the inner wall of the outer end of the second pipe section and the outer wall of the barrel and a flexible gasket is disposed in the groove to form a water-tight seal.

U.S. Pat. No. 4,796,669 to St. Onge discloses a method for relining pipeline with interconnectable plastic pipe sections. The plastic pipe sections are joined by either: 1) threading the end of one pipe into the end of another pipe, 2) using a buttress-type thread to interlock one end of one pipe to the opposite end of the second pipe, 3) forming two opposed, angular members, respectively, on either end of the pipe, the mating ends of two pipe sections sliding together and snap-fitting into position, or 4) joining the pipe sections by means of lap-joint members formed within the pipe walls and then preferably taping the outer periphery of the joint.

The prior-art structures encounter problems when used with a pipe having a variable wall thickness, especially if the pipe is used in microtunneling, slipjoining or pipe bursting applications. First, as previously described, it is advantageous to form a pipe consisting of pipe sections wherein the pipe has a smooth outer surface. This requirement eliminates the use of external collar joints and most bell and spigot joints, which usually have a section protruding from the outer surface of the pipe. Furthermore, even joints formed within the walls of the mated pipe sections, such as lap joints, do not provide a smooth outer surface if formed in a variable thickness wall.

Second, the pipe sections must be joined so that a significant amount of axial compressive force can be applied to the end of one pipe section and be transmitted through the joints to the other pipe sections in such a manner that the joints do not flex, buckle or telescope; the term telescoping meaning that the end of one pipe section is forced inside of the body of another pipe to which it is joined. This requirement eliminates the use of most joints formed within the walls of mated pipe sections because the application of a significant axial compressive force will cause the joints to deform or separate. Even when a standard lap joint is used, if the pipe sections have a variable wall thickness, the mating surfaces of the lap joints do not align properly because of the variation in wall thickness. This can cause one wall to bear the entire load which may cause the wall to deform and the joint to fail.

Finally, a constant-width gap between the lap joint members of the first pipe section and second pipe section must be maintained so that a gasket may be inserted to form a water-tight seal. Until this time, when joint profiles were formed in pipe sections having variable width walls, the profile dimensions varied as the thickness of the wall varied. Therefore, the profile formed in one pipe section rarely, if ever, properly aligned and mated with the profile formed in another pipe section. If a gap was created by the joining of two pipe sections, its dimensions varied according to the variations in the respective wall thicknesses of the pipe sections that were joined. As it will be understood, if the gap into which the gasket, or sealing member, is retained is too wide, the gasket will not form an adequate seal. If the gap is too narrow, the fit is too snug and the pipe sections cannot be joined.

SUMMARY OF THE INVENTION

The present invention solves these and other problems by providing a pipe section, preferably being made from solid plastic such as polyvinyl chloride ("PVC"), having a variable wall thickness. The ends of the pipe section are formed so that they can be joined with a mating end on another pipe section in order to form a force-transmitting joint having a uniform-width sealing gap and a smooth outer surface.

The invention comprises a pipe section comprised of an annular pipe wall of variable thickness having an outer surface and an inner surface, and a first end and a second end. A first joint member is formed at the first end of the pipe section and comprises a first support surface formed adjacent the outer surface and a sealing leg formed adjacent the inner surface. Importantly, the first support surface has a constant width, or thickness. The sealing leg has a variable thickness equal to the variable thickness of the pipe wall minus the constant width of the first support surface. A sealing member is affixed about the periphery of the sealing leg.

A second joint member is formed at the second end of the pipe section and comprises a second support surface formed adjacent the outer surface, wherein the second support surface has a constant width that is less than the width of the first support surface. A recess, having a sealing wall and a variable width is formed adjacent the outer surface.

When two pipe sections are joined, the first joint member of a first pipe section aligns with and is received by the second joint member of a second pipe section. Preferably, the sealing leg is shorter than the recess and is retained within the recess. The first support surface and second support surface then align in a force-transmitting relationship. Because the first support surface and second support surface have constant widths, a uniform or constant-width gap is formed between the sealing leg and the sealing wall of the recess, the sealing member being retained therein. Finally, the outer surfaces of the first pipe section and second pipe section align to form a smooth surface across the joint.

In another embodiment of the invention, a joint is provided for joining two sections of pipe. The joint comprises a first joint member having a first annular wall comprising a first outer surface and a first inner surface. A first support surface is formed adjacent the first outer surface, the first support surface having a constant width. A sealing leg is formed adjacent the first inner surface and has a variable width. A sealing member is positioned about the annular periphery of the sealing leg.

The joint further comprises a second joint member joined to the first joint member, the second joint member comprising a second annular wall of variable thickness having a second outer surface and a second inner surface. A second support surface having a constant width is formed adjacent the second outer surface and engages the first annular support surface in a force-transmitting relationship. A recess is formed adjacent the second inner surface, wherein the recess has a sealing wall and a variable width. The sealing leg is positioned at least partially within the recess, a constant-width gap being defined between the leg and the sealing wall of the recess. The sealing member is disposed within the gap to form a fluid-tight seal.

It is therefore an object of the present invention to provide a pipe section that can be assembled with other pipe sections to form a pipeline.

It is another object of the invention to provide a pipe that can be assembled with other pipe sections to form a pipeline used for microtunneling, sliplining or pipe bursting applications.

It is another object of the present invention to provide pipe sections that can be joined so as to form a smooth outer surface on a pipeline consisting of several pipe sections.

It is another object of the present invention to provide pipe sections wherein axially applied compressive force can be transmitted from one pipe section to another without disturbing or deforming the joints between pipe sections.

It is another object of the present invention to provide a pipe section as described above that connects to another pipe section to form a joint therebetween, the joint including a constant-width gap in which a sealing member is retained.

It is another object of the present invention to provide a pipe section having a first end and a second end and a first joint member formed at the first end and a second joint member formed at the second end, wherein the first joint member and second joint member have complementary structures that allow the first joint member of one pipe to join with the second joint member of another pipe.

It is another object of the present invention to provide a pipe section as described above wherein the pipe has a variable wall thickness.

It is another object of the present invention to provide a pipe section as described above that is produced from extruded plastic.

It is another object of the present invention to provide a pipe section as described above wherein the plastic is PVC.

It is another object of the present invention to provide a joint formed between two pipe, or conduit, sections. The joint comprises a first joint

BRIEF DESCRIPTION OF THE DRAWINGS

FIG. 1 is a perspective view of a pipe section in accordance with the present invention.

FIG. 2 is an end view of the pipe shown in FIG. 1, presenting an exaggerated view of a variable thickness wall.

FIG. 3 is a perspective view of the pipe section shown in FIG. 1 after joint members have been formed in the ends.

FIG. 4A is an enlarged cross sectional view taken along line 4A—4A of FIG. 3.

FIG. 4B is an enlarged cross sectional view taken along line 4B—4B of FIG. 3.

FIG. 5 is a cross sectional view of a preferred sealing member for use in the invention.

FIG. 6 is a perspective view of two pipe sections in accordance with the present invention prior to being joined.

FIG. 7A is an enlarged, cross sectional perspective view taken along line 7A—7A of FIG. 6.

FIG. 7B is an enlarged, cross sectional perspective view taken along line 7B—7B of FIG. 6.

FIG. 8 is an enlarged cross sectional view of a first joint member joined to a second joint member, in accordance with the present invention.

DETAILED DESCRIPTION OF THE PREFERRED EMBODIMENTS

Referring now to the drawings where the purpose is to illustrate a preferred embodiment of the invention and not to limit same, FIG. 1 shows a pipe, or conduit, section 10 preferably formed of extruded PVC or polyethylene, although other materials may be used. The extrusion process used to form pipe section 10 is well known by those skilled in the art. Generally described, the extrusion process begins by introducing plastic resin into an extruder wherein the material is heated, softened and forced through a die to form the pipe shape. The extruded pipe is then partially cooled in a water bath and then passes through a pulling device that pulls the extruded pipe from the die and through the water bath.

Normal production speeds for pipe made in pipe-extrusion operations vary between 300 and 3500 lbs/hr depending upon the pipe size being manufactured. Preferred nominal pipe sizes, the term nominal as used herein meaning the target manufacturing dimension, produced in a standard manufacturing process vary between 4" and 36" in outer diameter ("OD") and between 0.200" and 2.00" in wall thickness, although other pipe sizes could be used. As will be understood by those skilled in the art, however, when extruding a cylindrical plastic pipe, the outer dimension, the inner dimension and the shape, or roundness, of the pipe, vary within a given range known as manufacturing tolerances. Pipe section 10 has a first end 12 a second end 14, and an annular wall 16 having an inner surface 18 and an outer surface 20.

After the pipe is formed, it is cut into individual sections by a sawing device. Simultaneously, a router attached to the saw device cuts away some of the material on outer surface 20 of the pipe to form a first joint member, which is described in more detail below. The router is guided by outer surface 20 of pipe section 10, which enables the tool to form a uniform, or constant, width profile in wall 16, as will also be described further below. The sawing device, router and method of guiding by tracking the outer surface of the pipe section are all known to those skilled in the art.

Referring now to FIG. 2, first end 12 of pipe section 10 is shown. A thickness T of wall 16 is defined between inner surface 18 and outer surface 20. FIG. 2 intentionally exaggerates the variation in wall thickness of pipe section 10 so as to make the problem clear to the reader, the actual tolerances in wall thickness typically vary from ±0.020" to ±060", depending upon the nominal thickness of annular wall 16. For example, in a 36" OD pipe having a nominal wall thickness of greater than 1", the manufacturing tolerance is plus or minus 0.060". The manufacturing tolerances are usually smaller for pipe sections having a smaller OD and a smaller wall thicknesses.

As shown in FIG. 2, the thickness of wall 16 varies because of the manufacturing tolerances of surfaces 18 and 20. As it will be appreciated by those skilled in the art, the roundness of pipe section 10 can vary within the manufacturing tolerances and the pipe can be somewhat oblong or egg-shaped. Further, inner surface 18, as shown in FIG. 2, is not perfectly symmetrical therefore, the wall thickness T varies not only from pipe section to pipe section, but also across the circumference of any given cross section, as illustrated in FIG. 2.

FIGS. 3, 4A and 4B show a pipe section 10 after being machined to form joint members at each respective end. End 12 has a first joint member 22. Joint member 22 has a first support surface 24 formed therein, preferably by cutting with a router as described above. Surface 24 is preferably annular, extending about the periphery of wall 16. Support surface 24 is preferably planar and formed perpendicular to the longitudinal axis A of pipe section 100, however, surface 24 could also be formed at an angle and have a surface other than planar. Surface 24 has a constant, or uniform, width, the width of surface 24 being measured along a line that is perpendicular to axis A and that extends through the center C, shown in FIG. 2, of pipe section 10. The term constant, as used herein, means that the width of surface 24 only varies within the relatively small manufacturing tolerances of a profile formed by a router or similar tool. Optionally, surface 24 could be created by heat forming techniques in which pipe section 10 is heated and formed on a mold. The relatively small manufacturing tolerances referred to herein range from zero to plus or minus 0.020", depending on the OD and wall thickness of the pipe being formed. In a preferred embodiment, the tolerance is no greater than plus or minus 0.015". In a preferred embodiment in which pipe section 10 has a nominal diameter of 18" and wall 16 has a nominal thickness of 0.450", surface 24 has a constant width of 0.350".

A sealing leg 26 is formed adjacent inner surface 18, preferably by the same router cut that forms first support surface 24. Leg 26 extends outwardly from surface 24 and preferably is annular, extending about the periphery of inner surface 18. A sealing surface 28 is formed on leg 26 opposite inner surface 18. Leg 26 has a variable width which depends upon the thickness of wall 16. As shown in FIG. 4A, the width of leg 26, which is measured between sealing surface 28 and inner surface 18, is equal to the difference between the variable thickness T of wall 16 and the constant thickness of surface 24. In a preferred embodiment, the nominal thickness of leg 26 is 0.100". Leg 26 is shorter than the longitudinal side, or sealing wall, of the recess formed in the second joint member, which will be described in greater detail below. In a preferred embodiment, leg 26 has a nominal length of 1.750". An end 30 is formed in leg 26, end 30 being cut at an angle.

Turning now to FIG. 4B, a second joint member 32 is shown. Joint member 32 is preferably formed at a separate station in the manufacturing process after joint member 22 has been formed. This station includes a trough that includes an upper set of wheels and a lower set of wheels, that restrain pipe section 10 while still allowing it to move in the axial direction. The upper wheels are idler wheels, meaning that they are not driven, that hold pipe section 10 in position on the trough against the bottom wheels. The bottom wheels are driven and can turn pipe section 10 at various speeds. Both the upper and lower wheels are angled so that they convey pipe section 10 forward when the drive wheels are operating.

This station also includes a cutting apparatus, which consists of two major components: a) a plurality of spaced-apart rollers encircling pipe section 10 and being positioned against outer surface 20 so as to retain pipe section 10, and b) a fixed router positioned a fixed distance from the rollers. As the driven wheels turn and convey pipe section 10 forward, the plurality of rollers contain outer surface 20 as pipe section 10 rotates. End 14 of pipe section 10 is pressed against the fixed router, which begins to cut away a portion of inner surface 18. Pipe section 10 continues to be conveyed forward in an axial direction against the router and the router cuts away more of inner surface 18. Once the desired axial depth of cut is achieved end 14 of pipe section 10 will have moved forward far enough to activate a trip switch, stopping the router.

This operation leaves a second joint member 32 having a second support surface 34 formed adjacent to outer surface 20. Support surface 34 is preferably planar and formed perpendicular to the longitudinal axis A of pipe section 10, although other surface configurations could be used. A sealing surface 36 is formed opposite outer surface 20. Support surface 34 has a constant width, or thickness, as measured between outer surface 20 and sealing surface 36; the term constant being used in the same context as for previously described first support surface 24.

A recess wall 38 is formed adjacent inner surface 18 and is preferably perpendicular to inner surface 18 and sealing surface 36. A recess 40 is defined between sealing surface 36 and recess wall 38. Wall 38 and recess 40 have a variable width, or thickness, equal to the difference between the variable thickness of outer wall 16 and the constant width of support surface 34. In a preferred embodiment, the nominal width of wall 38 and recess 40 are 0.250". Recess 40 is formed to have a nominal longitudinal length, which is measured along sealing wall 38, of 2.000". Therefore, the longitudinal length of recess 40 is preferably 0.250" greater the longitudinal length of sealing leg 26, which is 1.750".

FIG. 5 shows a preferred sealing member 50 for use in the invention, although numerous configurations and materials could be used. Sealing member 50 is preferably formed of polyisoprene, EPDM rubber, neoprene, PVC or any suitable material. Sealing member 50 has a generally planar base 52 and preferably a plurality of sealing ribs 54 opposite base 52. An upwardly extending bumper 56 is formed at one end of sealing member 50 and a flap 58 is formed at the opposite end of sealing member 50. Flap 58 preferably extends downward at an angle as shown.

FIG. 6 shows a pipe section 10 in accordance with the present invention aligned prior to being joined with an identical pipe, or conduit, section 11, having the same structure and having been formed in the same manner as previously described pipe section 10. The first end 12 of pipe section 10 is aligned to join with second end 14 of pipe section 11. As best seen in FIG. 7, sealing member 50 is mounted on sealing leg 26 of first joint member 22, preferably by gluing, although other means of attachment could be used.

FIG. 8 shows a first joint member 22 of pipe section 10, including a sealing member 50, joined with a second joint member 32 of pipe section 11 to form a joint 100. Alternatively, joint 100 could be formed between two collar sections or sleeves and then attached or formed to pipe, or conduit, sections 10 and 11.

First support surface 24 and second support surface 34 align and bumper 56 of sealing member 50 is disposed therebetween. Alternatively, bumper 56 may not be used in which case the surfaces 24 and 34 may be in contact. In either case, when aligned as described herein, surfaces 24 and 34 are said to be in force-transmitting relationship, meaning that axially-directed compressive forces exerted on the end of one pipe section are transmitted to the other pipe section through the interface of surfaces 24 and 34.

Leg 26, with sealing member 50 attached is generally disposed within recess 40. Preferably neither the flap 58 or, if flap 58 is not used, end 30, contacts wall 38 of second joint member 32. The entire axial compressive force transmitted through joint 100 is born by surfaces 24 and 34 because leg 26 is narrow and may buckle or deform under the load.

As can be seen in FIG. 8, because surfaces 24 and 34 have a constant width, the outer surfaces 16 join to form a smooth outer surface across joint 100. The term smooth, as used herein, meaning that the outer surfaces 16 of two joined pipe sections align in a generally parallel fashion, meaning that they align according to the structure and manufacturing tolerances of the present invention.

Furthermore, because surfaces 24 and 34 have a constant width and surface 34 is not as wide as surface 24, a constant width, or uniform, gap G is formed between surface 28 of leg 26 and sealing surface 36, as best seen in FIGS. 4A and 8. The term constant, when used in this context, has the same meaning as previously described for the widths of surfaces 24 and 34. Therefore, sealing member 50 will always fit properly in the gap. As it will be appreciated, if gap G were too large, sealing member 50 would not adequately seal joint 100. If gap G were too small, sealing member 50 would not fit and first sealing member 22 and second sealing member 32 could not be joined.

Having thus described preferred embodiments of the invention, other variations and embodiments that do not depart from the spirit of the present invention will become readily apparent to those skilled in the art. The scope of the present invention is thus not limited to any one particular embodiment but is instead set forth in the appended claims and the legal equivalents thereof.

What is claimed is:

1. A conduit section having an outer wall, a first end and a second end, said wall having an inner surface and an outer surface, a variable thickness being defined therebetween, said conduit section comprising:
   a. first joint member formed at said first end, said first joint member comprising:
      i. a first support surface formed adjacent said outer surface, said first support surface having a constant width; and
      ii. a sealing leg formed adjacent said inner surface; and
   b. a second joint member formed at said second end, said second joint member comprising:
      i. a second support surface formed adjacent said outer surface, said second support surface having a constant width that is less than the width of said first support surface; and
      ii. a recess formed adjacent said inner surface;
   whereby said first joint member aligns and joins to the second joint member of a second conduit section and said second joint member aligns and joins with the first joint member of a third conduit section.

2. A conduit section as defined in claim 1 which is comprised of plastic.

3. A conduit section as defined in claim 2 wherein said plastic is PVC.

4. A conduit section as defined in claim 1 wherein said first support surface and said second support surface are planar.

5. A conduit section as defined in claim 1 wherein said wall has a nominal thickness and said first support surface is at least 75% as wide as the nominal thickness of said wall.

6. A conduit section as defined in claim 1 wherein said conduit has a longitudinal axis and said first support surface and said second support surface are each formed perpendicular to said longitudinal axis.

7. A conduit section as defined in claim 1 wherein said conduit has a longitudinal axis and said recess has a length as measured along said longitudinal axis, and said sealing leg has a length as measured along said longitudinal axis, said length of said leg being less than the length of said recess.

8. A joint formed between two sections of conduit, said joint comprising:
   a. a first joint member comprising:
      i. a first wall having a first outer surface and a first inner surface, a variable thickness being defined therebetween;
      ii. a first support surface formed adjacent said first outer surface, said first support surface having a constant width;
      iii. a sealing leg formed adjacent said first inner surface; and
   b. a second joint member joined to said first joint member, said second joint member comprising:
      i. a second wall having a second outer surface and a second inner surface, a variable thickness being defined therebetween;
      ii. a second support surface being formed adjacent said second outer surface, said second support surface having a constant width that is less than the width of said first support surface, said second support surface being in force-transmitting relationship with said first support surface;
      iii. a recess formed adjacent said second inner wall, said recess having a sealing wall, a constant-width gap being formed between said sealing wall and said sealing leg; and
   c. a sealing member retained within said constant-width gap, said sealing member contacting said sealing wall and said sealing leg.

9. A conduit section having an outer wall, a first end and a second end, said wall having an inner surface and an outer surface, a variable thickness being defined therebetween, said conduit section comprising:
   a first joint member formed at said first end, said first joint member comprising:
      i. a first support surface formed adjacent said inner surface, said first support surface having a constant width; and
      ii. a sealing leg formed adjacent said outer surface; and
   b. a second joint member formed at said second end, said second joint member comprising:
      i. a second support surface formed adjacent said inner surface, said second support surface having a constant width that is less than the width of said first support surface; and
      ii. a recess formed adjacent said outer surface;
   whereby said first joint member aligns and joins to the second joint member of a second conduit section and said second joint member aligns and joins with the first joint member of a third conduit section.

* * * * *